Patented Apr. 21, 1942

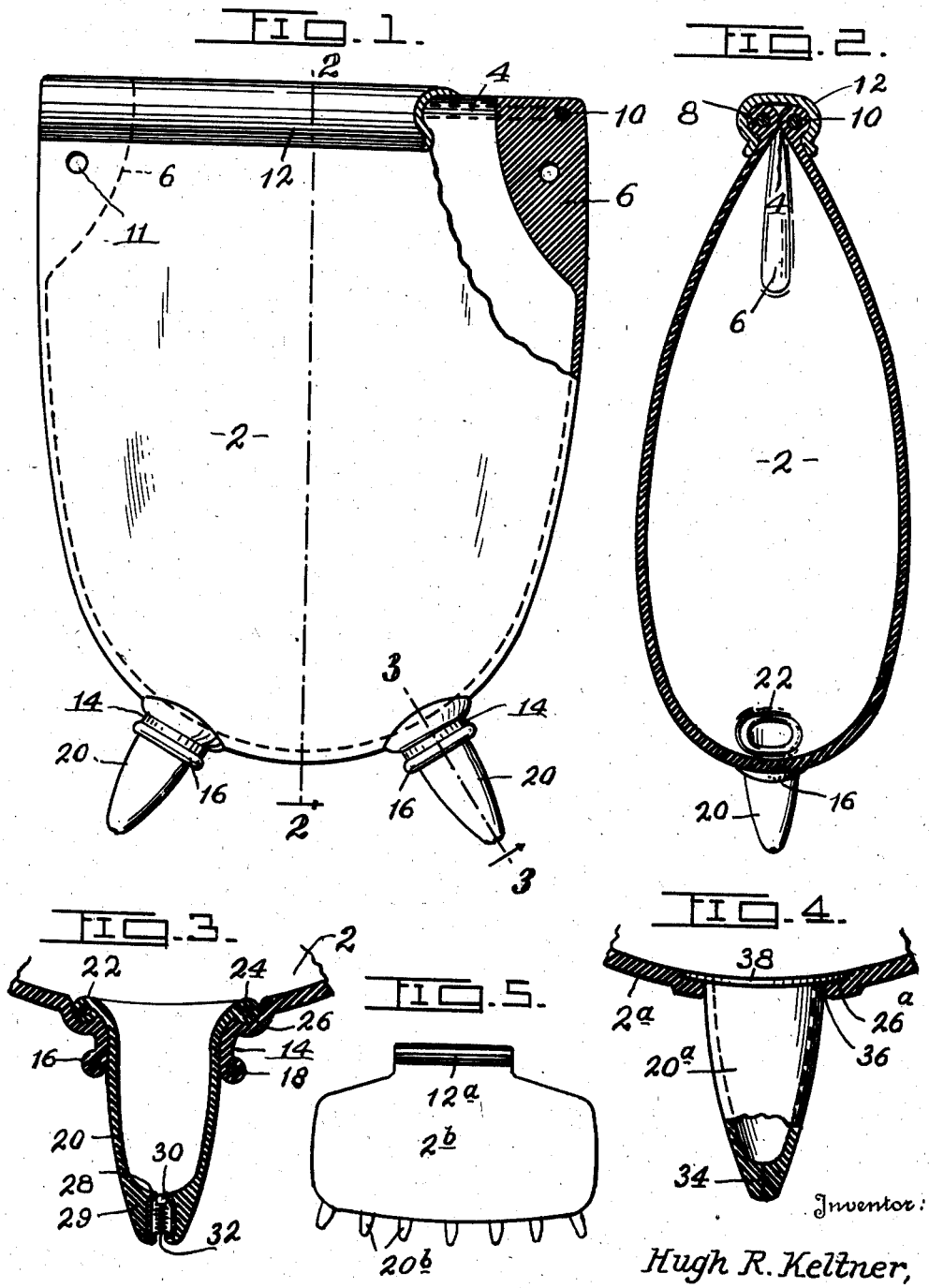

2,280,410

UNITED STATES PATENT OFFICE 2,280,410

NURSING BAG

Hugh R. Keltner, Johnson County, Kans.

Application December 2, 1940, Serial No. 368,177

4 Claims. (Cl. 119—71)

My invention relates to a feeding device in the form of a nursing bag for calves, lambs, shoates, colts and other young livestock, and one object of the invention is to provide a bag of this character which may be filled with milk or other liquid food and suspended at any convenient place within reach of the young animals.

Another object is to provide a rubber or other suitable nursing bag having an opening through which it may be filled, and means for closing said opening against the entrance of dust, dirt, or other foreign matter likely to contaminate the contents of the bag.

A further object is to provide a nursing bag having one or more teats, to accommodate one or more animals, said teats being preferably removable so that when damaged or worn out they may be replaced by others without discarding the entire bag.

Other objects will hereinafter appear, and in order that the invention may be fully understood, reference will now be had to the accompanying drawing, in which:

Fig. 1 represents a front elevation of the nursing bag partly broken away.

Fig. 2 is a vertical section on line 2—2 of Fig. 1.

Fig. 3 is an enlarged broken section on line 3—3 of Fig. 1.

Fig. 4 is an enlarged broken section showing a modified form of teat.

Fig. 5 is a modification of the bag with a large number of teats.

Referring more particularly to the device shown by Figs. 1 to 3, inclusive, 2 designates a flexible bag consisting preferably of rubber and provided with a filler opening 4 at its upper portion through which it may be supplied with milk or other liquid foods.

The upper corners of bag 2 are reinforced as indicated at 6 and its upper margin, surrounding the filler opening 4, is reinforced with beads 8 which in turn are strengthened by a continuous loop 10 consisting of cord, wire or other suitable material. Transverse holes 11 in the reinforcements 6 permit the bag to be suspended from nails, hooks, or other suitable supporting means, not shown.

In order that the bag may be tightly closed against the entrance of dust, dirt, or other foreign matter likely to contaminate the contents, I provide a spring clamp 12 of approximately U-cross section adapted to be slid longitudinally into position over the beads 8 to force them firmly together as disclosed by Fig. 2.

The lower portion of bag 2 is provided with a suitable number of nipples 14, each surrounded at its lower portion with a reinforcing bead 16 strengthened by a loop 18 which may be of cord, wire, or other suitable material.

Extending downward through each nipple 14 is a teat 20 consisting preferably of rubber and surrounded at its upper margin by a reinforcing bead 22 strengthened by a ring 24 to prevent the teat from being pulled downward through the associated nipple. The teats 20, however, on becoming damaged or worn out, may be readily pushed upward into the bag 2 from which they may be removed through the filler opening 4.

In order to prevent the contents of the bag from leaking through the joint between the nipples 14 and associated teats 20, the lower portion of the bag is provided with internal grooves 26 to receive the beads 22 at the upper ends of the respective teats.

Leakage through the opening in the lower end of each teat is prevented by a suitable self-closing valve consisting in the present instance of a casing 28 embedded in the thickened end 29 of the teat, a ball 30, and a coil spring 32 which yieldably holds the ball seated in the upper end of the casing 28. Although the valve prevents leakage it is readily opened by an animal when sucking milk or some other liquid food from the bag.

Fig. 4 discloses a more simple arrangement in which the valve is dispensed with, as the rubber or other suitable composition forming the teat 20a is depended upon to normally retain the teat outlet 34 closed against leakage until suction is applied.

Leakage through hole 36 in the bottom of bag 2a is prevented by a marginal flange 38 surrounding the upper end of teat 20a and seated in an internal groove 26a surrounding the hole 36. As a further precaution against leakage an adhesive coating may be applied to the underside of the flange 38 to seal it in the grooved portion 26a of the bag.

Fig. 5 discloses a bag 2b, which in practice, may be of larger capacity than the bag 2 and is provided with a larger number of teats 20b so that a greater number of animals may feed at the same time. The filler opening in the upper end of bag 2b is sealed against the entrance of foreign matter by means of a spring clamp 12a somewhat similar to the clamp 12.

From the foregoing it is apparent that I have provided a nursing bag which will save dairymen and others considerable time and labor over the old method of feeding calves and other young animals by hand with a bottle containing a single nipple, as with my invention the bag may be filled with milk, or other liquid food, sealed against the entrance of foreign matter, and then suspended in a convenient place where it will be accessible to the animals.

My method of feeding is also a big improvement over the method of feeding from a bucket which not only results in considerable waste of the liquid food due to spillage, but sometimes results in strangulation, or the contraction of pneumonia due to the habit of young animals plunging their mouth and nostrils into the liquid, inhaling the latter and thereby flooding the lungs.

While I have shown several forms of my invention I reserve all rights to such other forms and modifications thereof as properly fall within the spirit and scope of the invention as claimed.

Having thus described my invention, what I claim and desire to secure by Letters Patent, is:

1. A feeding device comprising a nursing bag having a filler opening in its upper portion and a plurality of holes in its lower portion, and a removable flexible teat extending through each hole and surrounded at its upper end with an integral marginal bead overlapping the margin of the associated hole.

2. A feeding device comprising a nursing bag having a filler opening in its upper portion and a plurality of holes in its lower portion, a removable flexible teat extending through each hole and surrounded at its upper end with an integral marginal bead overlapping the margin of the associated hole, and reinforcing means enclosed in said bead.

3. A feeding device comprising a bag having one or more holes in its lower portion and an internal groove surrounding each hole, a flexible teat extending down through each hole, and a bead integral with and surrounding the upper end of each teat and removably seated in the groove.

4. A feeding device comprising a flexible bag having one or more nipples integral with its lower portion, a marginal bead surrounding the lower end of each nipple, and a teat extending down through each nipple and provided at its upper end with a marginal bead overlapping the upper end of the associated nipple.

HUGH R. KELTNER.